(12) United States Patent
Gudipati (10) Patent No.: US 12,335,434 B2
(45) Date of Patent: Jun. 17, 2025

(54) ACTIVE CALL LAWFUL INTERCEPTION AND PRESERVATION TECHNIQUE

(71) Applicant: Mitel Networks Corporation, Kanata (CA)

(72) Inventor: Venkata Ajaresh Gudipati, Bangalore Karnataka (IN)

(73) Assignee: Mitel Networks Corporation, Ottawa (CA)

(*) Notice: Subject to any disclaimer, the term of this patent is extended or adjusted under 35 U.S.C. 154(b) by 190 days.

(21) Appl. No.: 17/890,779

(22) Filed: Aug. 18, 2022

(65) Prior Publication Data

US 2024/0064230 A1    Feb. 22, 2024

(51) Int. Cl.
| | |
|---|---|
| *H04M 11/04* | (2006.01) |
| *G10L 15/18* | (2013.01) |
| *G10L 15/30* | (2013.01) |
| *H04M 3/22* | (2006.01) |
| *H04M 3/42* | (2006.01) |

(52) U.S. Cl.
CPC ........... *H04M 3/2281* (2013.01); *G10L 15/18* (2013.01); *G10L 15/30* (2013.01); *H04M 3/42221* (2013.01); *H04M 2201/405* (2013.01); *H04M 2201/42* (2013.01); *H04M 2242/04* (2013.01)

(58) Field of Classification Search
CPC ........... H04M 3/2281; H04M 3/42221; H04M 2201/42; H04M 2242/04; H04M 2203/655; H04M 2201/405; H04M 2201/40; G10L 15/30; G10L 15/18; G06F 40/30; G06F 40/169; G06F 21/577; H04L 67/306; H04L 63/1425
USPC ........................................................ 379/51
See application file for complete search history.

(56) References Cited

U.S. PATENT DOCUMENTS

| | | | |
|---|---|---|---|
| 8,284,905 | B1 | 10/2012 | Suri |
| 2017/0264739 | A1 | 9/2017 | Smith |
| 2020/0177732 | A1 | 6/2020 | Mossoba et al. |
| 2021/0390553 | A1* | 12/2021 | Brinig .................. G06F 40/169 |
| 2022/0377093 | A1* | 11/2022 | Crabtree ............. H04L 63/1425 |
| 2023/0020523 | A1* | 1/2023 | Kulkarni ............... G06F 21/577 |

* cited by examiner

*Primary Examiner* — Md S Elahee (57) ABSTRACT

A communication system and method for identifying a threatening and/or illegal call includes (1) a telephony network, (2) a first user device in communication with the telephony network, wherein the first user device is assigned to a first user who is an organization member, (3) a second user device in communication with the telephony network, wherein the second user device is assigned to a second user who is not an organization member, (4) a communications server in communication with at least the first user device, (5) a natural language processor (NLP) in communication with the communications server; and (6) a threatening language database in communication with the communications server and/or the NLP. The NLP is configured to monitor language used by the second user during a communication with first user to identify threatening language by comparing the language used by the second user to the threatening language in the threatening language database.

19 Claims, 7 Drawing Sheets

ACTIVE CALL LAWFUL INTERCEPTION AND PRESERVATION TECHNIQUE

FIELD

This disclosure relates to systems and methods for detecting threatening and/or illegal calls. When such a call is detected, it may be routed to another person who would be a silent listener on the call and/or recorded and stored.

BACKGROUND

In general, emergency calls made to a specific emergency number (such as 911) are recorded and monitored by authorities such as the police or other emergency services personnel. However, normal calls between individuals are usually not monitored. If an organization member (referred to herein as a "first user"), such as an employee or contractor, receives a threatening call from outside of the organization, there is no automated way to immediately alert another person, such as a supervisor, human resources person, or law enforcement personnel, during the call. Nor is there is a simple way to record and store the call, or to determine its threat level, or to determine whether the language used in the call is illegal.

Currently, if the call is not recorded or traced immediately, it is difficult for the first user who received the call to describe or provide evidence to trace the call or determine if the call was illegal. Normally, the first user must manually report the call after it is completed to someone else, such as a legal authority, with all details recalled so the person who made the call can be traced, if possible.

Any discussion of problems provided in this section has been included solely for the purpose of providing a background for the present disclosure and should not be taken as an admission that any or all of this background was known at the time the invention was conceived.

BRIEF DESCRIPTION OF THE DRAWING FIGURES

The subject matter of the present disclosure is particularly pointed out and distinctly claimed in the concluding portion of this specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of embodiments of the present disclosure provided herein is merely exemplary and is intended for purpose of illustration only; the following description is not intended to limit the scope of the invention disclosed herein. Moreover, recitation of multiple embodiments having stated features is not intended to exclude other embodiments having additional features or other embodiments incorporating different combinations of the stated features.

The systems and methods herein addresses the problem of organization members receiving threatening phone calls. A system and method according to this disclosure monitors calls and analyzes them for threatening and/or illegal language. If such language is identified, the system and method (1) provides the user with interface options, and/or (2) automatically activates one or more interfacing options.

With the proposed solutions, a call can be identified as threatening and/or illegal during the call itself and the call and/or information about the call can be (1) recorded and stored, and/or (2) routed to one or more other persons who can listen silently, gather information about the call, and possibly take immediate action regarding the call. If the call is determined to be illegal, law enforcement may be alerted during the call, in which case immediate action could potentially be taken against the person making the illegal call.

One option provided by a system and method of this disclosure is to record and store all or part of the call for future reference. The amount of the call recorded can be configurable by the system with some default value such as five minutes. Cached information regarding the call may be included in the recording.

In some aspects of this disclosure, there are selected users of the organization whose calls are monitored. Such users (each a "first user") could be executives, customer service personnel, persons who work in critical conditions, or other selected users. This disclosure, however, is not limited to having selected users.

Instead of monitoring all or a random subset of calls, the system and method can be interfaced with and use publicly-available social media content to identify suspended accounts or threatening language used against the first user on social media. This can provide indicators if the user from outside the organization making the call (referred to herein as a "second user") is making threats against the first user.

As used herein, the terms application, module, analyzer, engine, and the like can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium is non-transitory and can also be, or be included in, one or more separate physical components or media (e.g., solid-state memory that forms part of a device, disks, or other storage devices).

Figure 1:
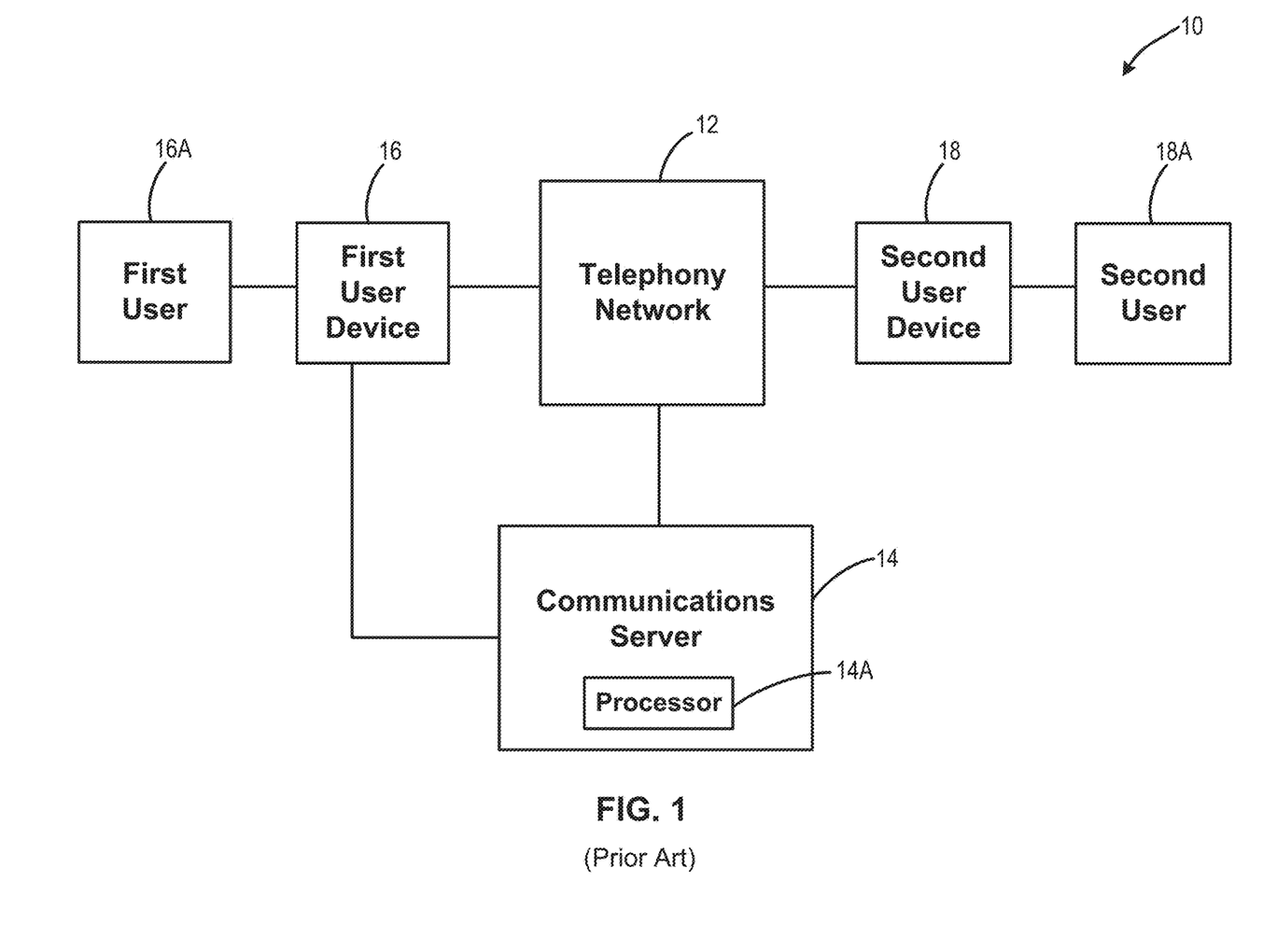
FIG. 1 is a block diagram of a prior art system.

FIG. 1 is a block diagram of an existing, prior art, system 10 that includes a telephony network 12 (which can be any type of telephone system capable of connecting user devices, such as cell phones, land-line phones, or computers), a communications server 14 that is local to an organization (such as a business, charity, or governmental organization) such that, for example, internal calls can be routed through server 14 without going through the telephony network 12. Communications server 14 as shown is in communication with telephony network 12 and has a processor 14A.

A first user device 16 is assigned to first user 16A, who is a member (such as an employee or contractor) of the organization to which communications server 14 is assigned.

First user device 16 may be any type of telephonic device, such as a cell phone, land-line phone, or computer that is in communication with one or both of telephony network 12 and communications server 14. Calls to and from first user device 16 may be routed through communications server 14 to and from telephony network 12, or routed directly to and from telephony network 12 to first user device 16.

A second user device 18 is assigned to a second user 18A, who is not an organization member. Second user device 18 is in communication with telephony network 12 and can contact (or communicate with) first user device 16 through telephony network 12. Second user device 18 is not in direct communication with communications server 14.

Figure 2:
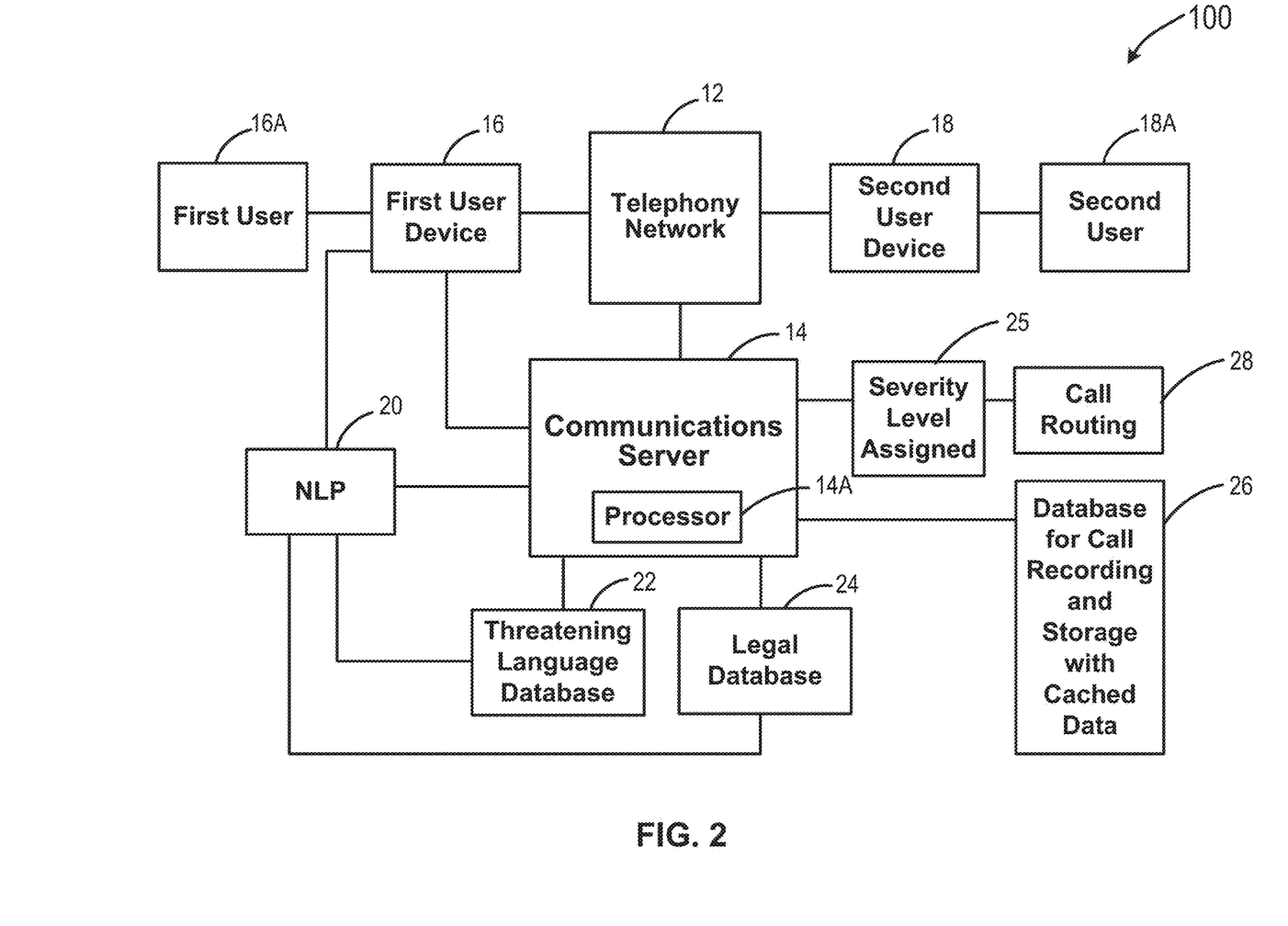
FIG. 2 is a block diagram of a system in accordance with aspects of this disclosure.

FIG. 2 shows a system 100 according to aspects of this disclosure. As with system 10, system 100 has telephony network 12, communications server 14, first user device 16 assigned to first user 16A, and second user device 18 assigned to second user 18A.

System 100 further includes devices configured to detect, route, and record threatening calls from second user device 18 made to first user device 16. System 100 accomplishes this by (1) analyzing the language used by the second user 18A by a natural language processor (NLP) 20, and (2) comparing the language used by second user 18A to language (which includes stored words and/or phrases) stored in a threatening language database 22 and/or a legal database 24. If the language used by second user 18A is determined to be threatening or illegal, communications server 14, via processor 14A, may automatically route the call and/or record and store the call, or the first user 16A may have the option to route the call and/or record and store the call.

System 100 includes NLP 20 that can communicate directly with first user device 16, or that can communicate with first user device 16 through communications server 14. NLP 20 is also in direct communication with, or indirect communication with (1) communications server 14, (2) threatening language database 22, and (3) legal database 24 (which is optional).

Threatening language database 22 contains words and/or phrases that are considered to be threatening in nature, and such words and/or phrases can be determined by the organization, or by another entity and used by the organization in database 22. Such words and/or phrases may include profane and/or unacceptable racial, religious, violent, or ethnic terms.

Legal language database 24 includes words and/or phrases that are considered illegal, and the illegality may be determined based on the laws where first user 16A is located or where the organization is located. Legal database 24 may include language that constitutes an overt threat of violence and/or dishonest offers (such as a request to send money for a dishonest purpose) or to steal passwords or steal other organizational information.

Threatening language database 22 and legal database 24 are in communication with processor 14A of communications server 14. Threatening language database 22 and legal database 24 may be resident on processor 14A or independent of processor 14A. Processor 14A compares the language of second user 18A as analyzed by NLP 20 to the language in one or both of threatening language database 22 and legal database 24 to determine if the language of second user 18A is threatening and/or illegal. If the language is not threatening and/or illegal no further action is taken.

If the language of second user 18A is threatening and/or illegal, processor 14A of system 100 (or system 200 and 300, described below) may ascribe a severity level of, for example, 1-3 or 1-5, wherein 3 or 5, respectively, would be the highest severity and 1 would be the lowest severity. The severity level would be assigned by processor 14A based on the type and amount of threatening and/or illegal language used by second user 18A.

Figure 3:
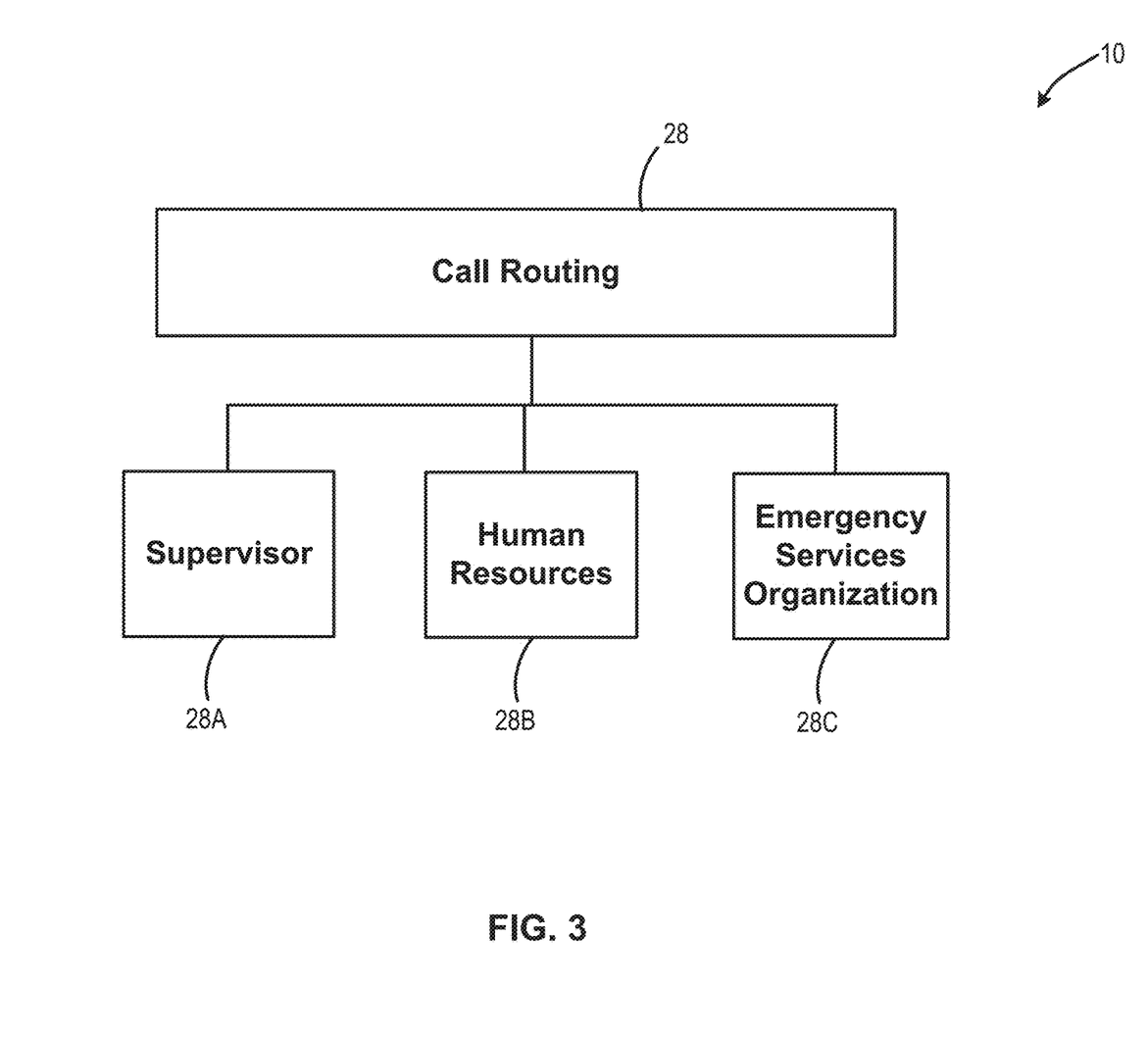
FIG. 3 is a block diagram of options for routing a threatening call.

Based on the severity level assigned by processor 14A, first user 16A or communications server 14 may route the call to one or more different entities (or persons) to listen to the call as a silent listener, which means that second user 18A does not know that there is an additional listener other than first user 16A. As shown, for example, in FIG. 3, the silent listener may be one or more of the supervisor 28A of first user 16A, a person 28B in the human resources department of the organization, and someone 28C at an emergency services organization, such as the police, organizational security, or a federal or state agency.

Turning again to FIG. 2, if the call is threatening and/or illegal first user 16A or processor 14A may instruct that the call be recorded and stored, along with any cached data related to the call, in database 26. Cached data may include, but is not limited to (1) the phone number of second user device 18, (2) the name of second user 18A, (3) the owner name associated with second user device 18, (3) the internet protocol (IP) address of second user device 18, and (4) the geographical location (which can be determined by a global positioning system (GPS)) of the second user device 18. Any amount of the call and cached data may be recorded and stored, and they system may be set for a default value such as sixty seconds of recording time. The system may also record the call starting from when cached data first becomes available and stop at the end of the call.

Figure 4:
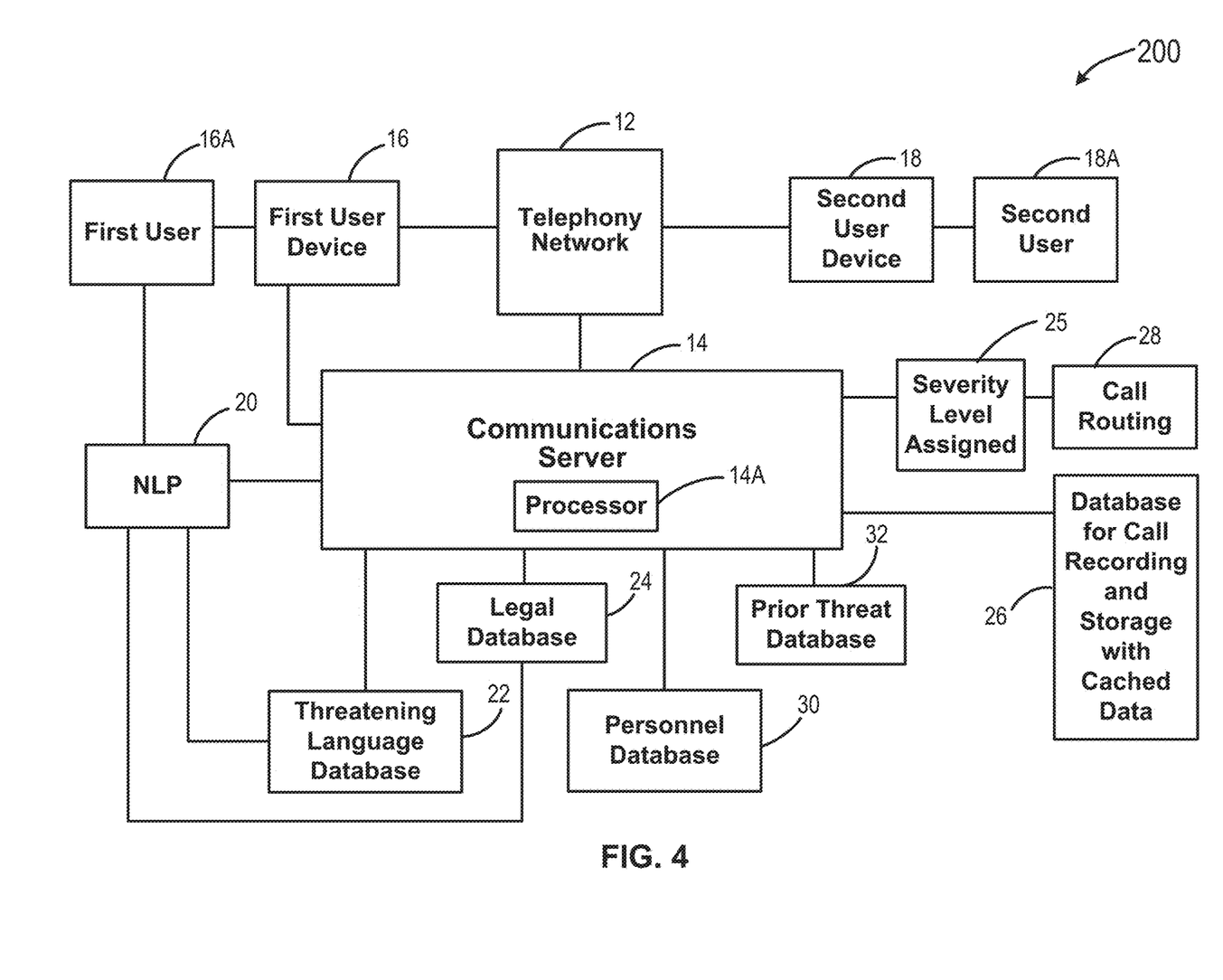
FIG. 4 is a block of an alternative system in accordance with aspects of this disclosure.

FIG. 4 is a block diagram of a system 200 in accordance with this disclosure. System 200 is the same as system 100 except that it further includes a personnel database 30 and a prior threat database 32. If a threatening and/or illegal call is identified by processor 14A, system 200 can potentially, by utilizing information related to the threatening and/or illegal call, determine whether the call is from a current or former employee or contractor of the organization by querying personnel database 30. Such information may include the name of the second user 18A, the phone number or IP address of the second user device 18, or the name associated with the second user device 18. Based on any information received from personnel database 30, processor 14A may adjust the severity level of the call. For example, the threatening and/or illegal call is determined to be from a disgruntled ex-employee or from an ex-employee or ex-contractor who was fired for cause, and/or who was known to dislike first user 16A, the severity level may be increased. Any information received from personnel database 30 may be included with the cached information stored in database 26 and/or may be sent to one or more silent listeners 28A, 28B, and 28C.

If a threatening and/or illegal call is identified by processor 14A, system 200 can potentially, by utilizing information related to the threatening and/or illegal call, determine whether the call is from a second user 18A who made a prior threat to first user 16A or to another person in the organization, by querying prior threat database 32. Such information may again include the name of the second user 18A, the phone number or IP address of the second user device 18, or the name associated with the second user device 18. Also, the location of the second user device 18 may also be utilized and the language used by second user 18 may be compared to language used in prior threatening and/or illegal calls to identify similar idiosyncrasies in speech. Based on any information received from prior threat database 32, processor 14A may adjust the severity level of the call, especially if the call is from a person who had made prior threatening and/or illegal calls, in which case the severity level may be increased. Any information received from prior threat database 32 may be included with the cached information stored in database 26 and/or may be sent to one or more silent listeners 28A, 28B, and 28C.

Prior threat database 32, via communications through communications server 14 or other communications, may collect information from one or more of prior calls in database 26, first user devices 16, and social media network 34 (shown in FIG. 5) to identify organization users that are suspected to be threatened. The information collected and stored in database 32 can include prior threatening and/or illegal calls, text messages, emails, and communications or other information from social media network 34. This collected information can be used by processor 14A to create a list of organizational users for monitoring.

Figure 5:
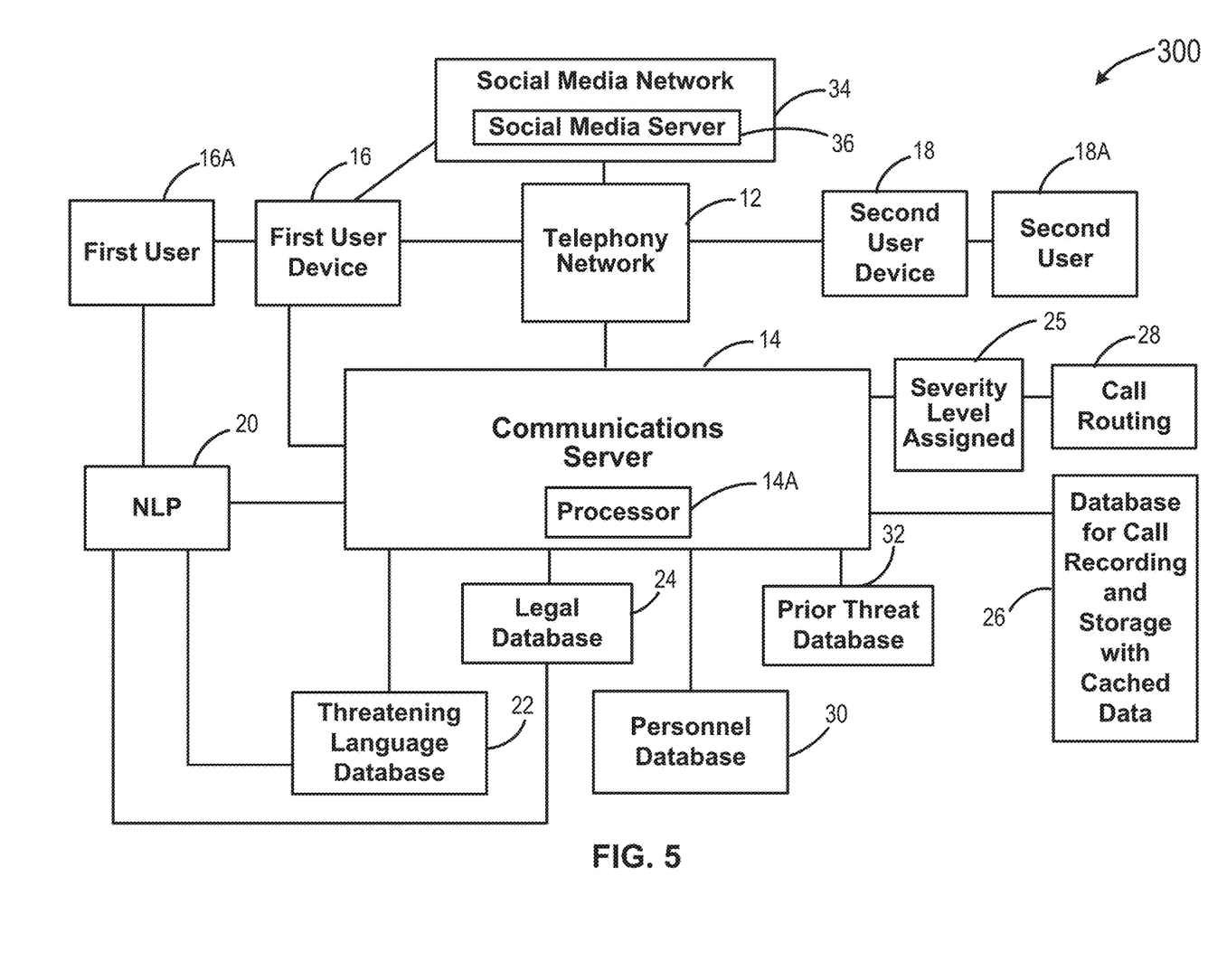
FIG. 5 is a block diagram of an alternative system in accordance with aspects of this disclosure that includes a social media network.

FIG. 5 shows a system 300 in accordance with this disclosure. System 300 is the same as system 200 except that it is further configured to communicate with a social media network 34 having a social media server 36. Utilizing system 300, communications server 14, either directly or through first user device 16, can compare information, such as the name of the second user 18A, the phone number of the second user device 18, or the name associated with the second user device 18, to available information in the social media network 34. Processor 14A can determine if such call information is associated with a suspended or cancelled social media account, the name of the owner of the suspended or cancelled account, any relationship between first user 16A and second user 18A shown in the social media network 34, any communications between first user 16A and second user 18A on the social media network 34, or any comments about the organization made by second user 18A on social media network 34.

Based on any information received from social media network 34, processor 14A may adjust the severity level of the call, especially if the call is from a person who had made angry or threatening comments about first user 16A or the organization on social media network 34, or if second user 18A's account had been suspended or cancelled due to threatening or illegal activity. In any of those situations the severity level may be increased. Any information received from social media network 34 may be included with the cached information stored in database 26 and/or may be sent to one or more silent listeners 28A, 28B, and 28C.

Figure 6:
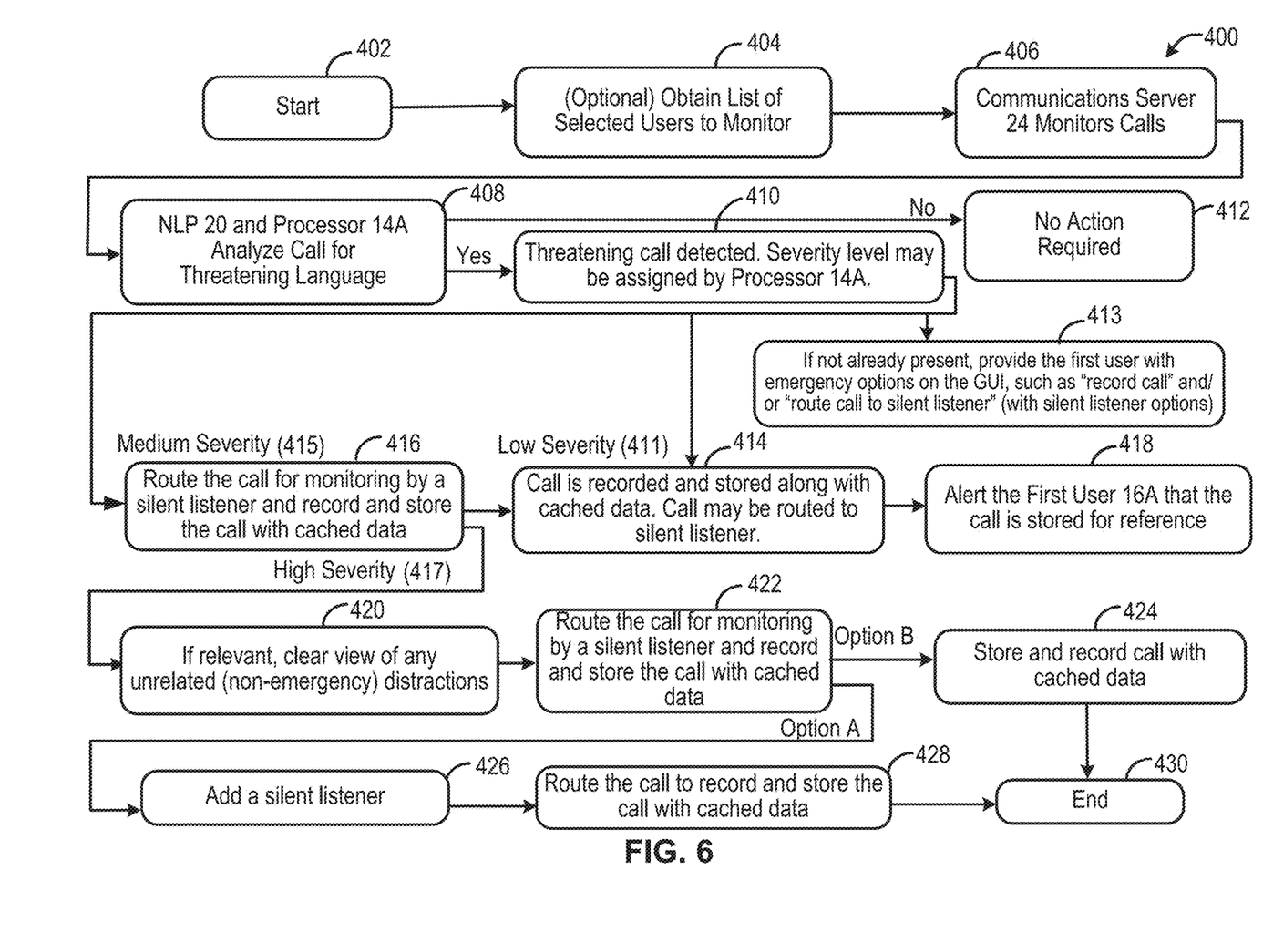
FIG. 6 is a block diagram of an exemplary process according to aspects of this disclosure.

FIG. 6 is a block diagram of one process (or method) 400 according to aspects of this disclosure, with it being understood that systems of this disclosure may perform other methods and include additional method steps or may not include some of the method steps shown in FIG. 6. Process 400 starts (402) with obtaining (404) a list of selected users in the organization whose calls are automatically monitored (406) (preferably by communications server 14) by system 100, 200, or 300. Instead, all organizational members' calls could be automatically monitored, or any first user 16A could route a call to be monitored by a silent listener and/or be recorded and stored.

At step (408) the call is analyzed by NLP 20 and processor 14A for threatening (and/or illegal) language utilizing the threatening language database 22 and illegal language database 24. If the processor 14A determines that the call is not threatening and/or illegal, no action is required (412). If processor 14A detects (410) a threatening call, the processor 14A may assign a severity level of either low (411), medium (415), or high (417). In any of those cases, if emergency options are not already present on a graphical user interface (GUI) for the first user, the first user may be provided (413) emergency options on the GUI, such as "record call" and/or "route call to silent listener" (with multiple silent listener options). A threatening and/or illegal call may be forwarded to one or more silent listeners 28A, 28B, and 28C, and/or be recorded and stored along with related cached data (414), (416), and (422) in database 26. The first user 16 may receive (418) an alert that the call has been recorded and stored in database 26.

Figure 7:
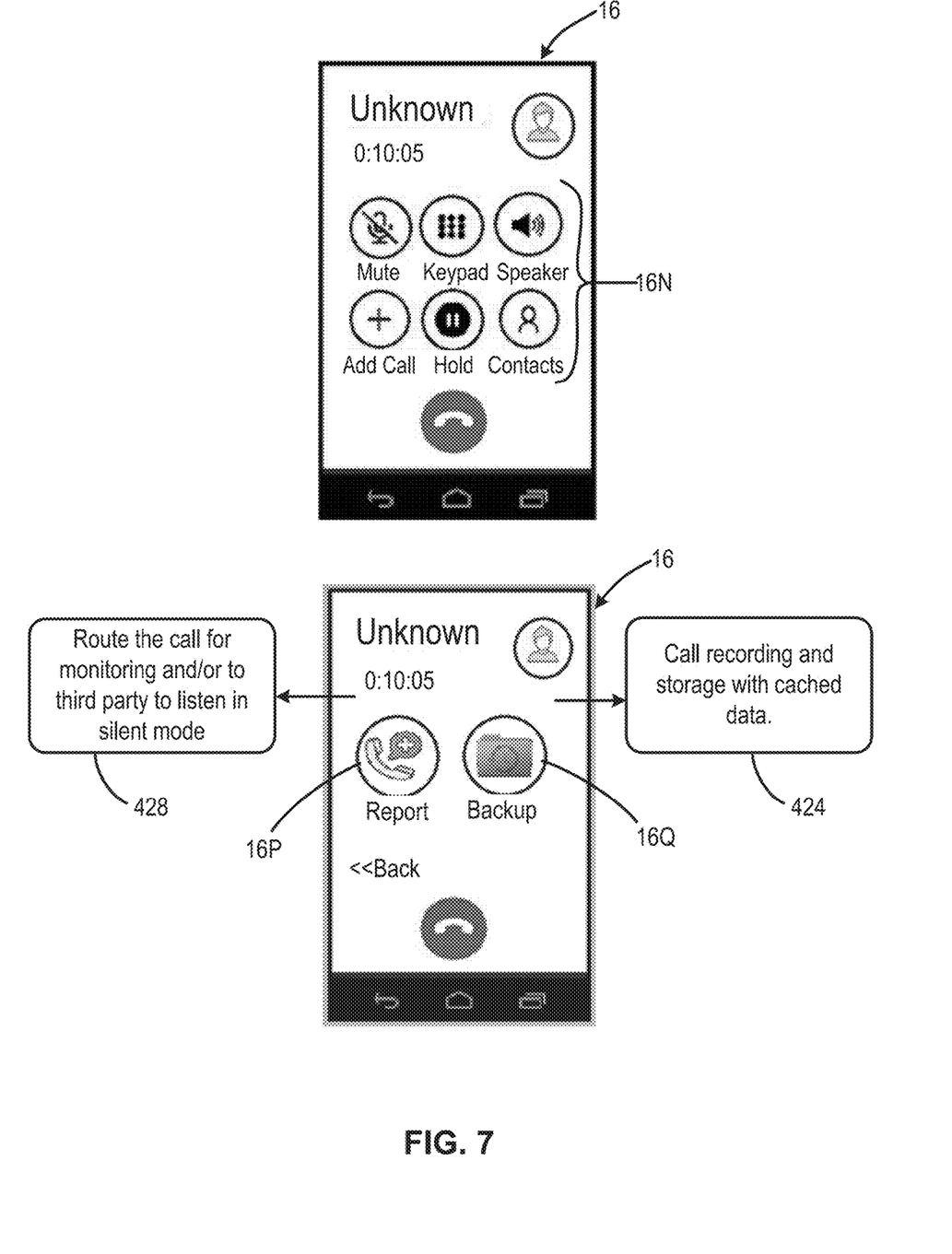
FIG. 7 illustrates a user device with functions according to aspects of this disclosure.

FIG. 7 shows two views of a first user device 16, which as shown is a cell phone. In the top view, first user device 16 is displaying ordinary commands 16N. In the bottom view, commands 16P, 16Q according to this disclosure. Using command 16P first user 16A can report a potential threatening and/or illegal call by sending it to one or more silent listeners 28A, 28B, and 28C (such as in step 428 of method 400). Using command 16Q first user 16A can send a threatening and/or illegal call to database 26 where it is recorded and stored (such as in step 424 of method 400).

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may stand alone or be combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

What is claimed is:

1. A communication system for identifying a threatening call, the communication system comprising:
 a telephony network configured to route calls;
 a first user device in communication with the telephony network, wherein the first user device is assigned to a first user who is an organization member of an organization;

a second user device in communication with the telephony network, wherein the second user device is assigned to a second user who is not an organization member;

a communications server in communication with the first user device; and a natural language processor (NLP) in communication with the communications server; and a threatening language database, wherein the threatening language database is in communication with the communications server;

wherein when the second user device is in communication with the first user device through the telephony network the communications server is configured to monitor language used by the second user during the communication, and utilizing the NLP, to identify threatening language by comparing the language used by the second user to the threatening language in the threatening language database;

wherein the communications server is configured to assign a risk factor to the communication based on one or more of (a) threatening language identified during the communication, (b) information in a social media database related to the second user, (c) comparing the threatening language identified during the communication to information in a legal database related to unlawful language for telephonic communications and laws associated with the unlawful language, (d) information in a personnel database related to the second user, and (e) information in a prior-threat database related to the second user; and wherein the communication server increases the assigned risk factor in response to identifying by the communication server at least one of (a) a relationship between the first user of the first user device and the second user of the second user device on a social media network, (b) a comment about the organization associated with the first user by the second user on the social media network, and (c) association of the second user of the second user device with a suspended or canceled account on the social media network.

2. The communication system of claim 1, wherein the communications server is further configured to determine if the communication by the second user device is a threatening communication based on an amount and a type of threatening language identified.

3. The communication system of claim 2 that further includes a communication database in communication with the communications server and configured to save all or part of the communication from the second user device.

4. The communication system of claim 1 that further includes a legal database comprising unlawful language for telephonic communications and laws associated with the unlawful language, wherein the legal database is in communication with the communications server, and the communications server is configured to determine if the communication from the second user is unlawful based on a comparison of the language of the second user to the unlawful language.

5. The communication system of claim 1 that further includes a social media database in communication with the communications server that includes (a) identities of suspended social media accounts, (b) for each of the suspended social media accounts, the reason as to why it was suspended, (c) a name of an owner of the social media account, (d) content of threatening social media posts by the owner, and (e) content of posts by the owner that reference the first user.

6. The communication system of claim 1 that further comprises a personnel database of former employees and/or former contractors of the organization, wherein the communications server is in communication with the personnel database and is configured to determine if the second user is a former employee or former contractor of the organization by comparing one or both of a phone number or name of the second user to the information in the personnel database.

7. The communication system of claim 1 that further comprises a prior-threat database of previous threatening communications and the name and phone number associated with each of the previous threatening communications, wherein the prior-threat database is in communication with the communications server and the communications server is further configured to compare a name and/or phone number associated with the previous threatening communications with a name of the second user and/or the phone number of the second user device to determine if there is a match.

8. The communication system of claim 1, wherein if the communication is identified as threatening, and based on the risk factor assigned, the communication server is further configured to perform one or more of the following functions: (a) contact one or more of (i) a human resources department of the organization, (ii) a supervisor of the first user, and (iii) law enforcement; (b) permit access to the communication by one or more third user devices in communication with the telephony network, wherein each of the one or more third user devices is assigned to one or more of (i) a human resources department individual of the organization, (ii) a supervisor of the first user, and (iii) a law enforcement official, and wherein the access is without knowledge of the second user; and (c) permit the first user to send an emergency message utilizing a graphical user interface (GUI) connected to the communication system.

9. The communication system of claim 1 that further includes a first user computing device and a recording device, wherein upon identifying a threatening communication the communications server is configured to display on the first user computing device a cached call for the first user, and the recording device records (a) the cached call spoken by the first user, and (b) the second user.

10. A method of identifying a threatening call by utilizing a communication system including a telephony network configured to route calls, a first user device of a first user that is an organization member of an organization, wherein the first user device is in communication with the telephony network, and a communications server in communication with the first user device, wherein the method comprises the steps of:

receiving, by the first user device, a communication through the telephony network from a second user device operated by a second user who is not an organization member;

comparing, utilizing a NLP in communication with the communications server and a threatening language database in communication with the communications server, the language of the second user to language in the threatening language database;

based on the comparison, determining by the communications server whether the communication is a threatening communication;

the communications server assigns a risk factor to the communication based on one or more of (a) threatening language identified during the communication, (b) information in a social media database related to the second user, (c) comparing the threatening language identified during the communication to information in a legal database related to unlawful language for telephonic communications and laws associated with the unlawful language, (d) information in a personnel database related to the second user, and (e) information in a prior-threat database related to the second user, and wherein the communications server increases the assigned risk factor in response to identifying by the communications server at least one of (a) a relationship between the first user of the first user device and the second user of the second user device on a social media network, (b) a comment about the organization associated with the first user by the second user on the social media network, and (c) association of the second user of the second user device with a suspended or canceled account on the social media network.

11. The method of claim 10 that further comprises the step of storing contact information for individuals in a second user database and the contact information comprises one or more of a name, a phone number, social media contact information, a birth date, and a photograph.

12. The method of claim 10 that further comprises the step of storing in a communication database all threatening communications received by a set of first users designated by the organization.

13. The method of claim 10 further comprising the step of recording and storing a predefined length of the communication in a communication database.

14. The method of claim 12, wherein the communications for each of the set of first users are continually recorded and stored.

15. A communication system, comprising:
a telephony network configured to route calls;
a first user device in communication with the telephony network, wherein the first user device is assigned to a first user who is an organization member of an organization;
a communications server in communication with the first user device, wherein the communications server comprises a processor;
a NLP in communication with the communications server; and
a legal database comprising unlawful language for telephonic communications and laws associated with the unlawful language, wherein the legal database is in communication with the communications server; and
a tangible, non-transitory memory configured to communicate with the processor, the tangible, non-transitory memory having instructions stored thereon that, in response to execution by the processor, cause the processor to perform operations comprising:

monitoring language used by a second user who is not an organization member during a communication between the first user device and a second user device in communication with the telephony network, wherein the second user device is assigned to the second user;
identifying threatening language in the communication;
determining if the communication is unlawful by comparing the language used by the second user to the unlawful language for telephonic communications,
wherein one or more of (a) a threatening language database, (b) a communication database, (c) the legal database, (d) a social media database, (e) a prior-threat database, and (f) a selected user database are resident on the communications server; and the processor is further configured to direct the communications server to compare the language used by the second user to the one or more databases (a)-(f) and assign a risk factor to the communication, and
wherein the communications server increases the assigned risk factor in response to identifying by the communications server at least one of (a) a relationship between the first user of the first user device and the second user of the second user device on a social media network, (b) a comment about the organization associated with the first user by the second user on the social media network, and (c) association of the second user of the second user device with a suspended or canceled account on the social media network.

16. The communication system of claim 15 that further includes a database of selected users in the organization whose calls are monitored, wherein the database of selected first users is in communication with the communications server and the communications server only monitors communications on user devices of the selected first users.

17. The communication system of claim 15, wherein the communications server is further configured to determine the identification of the second user, the phone number of the second user device, and the physical location of the second user device.

18. The system of claim 15 that further comprises a plurality of recording devices that are each configured to record unlawful communications and a plurality of transcription devices that are each configured to transcribe unlawful communications.

19. The system of claim 15 that further includes a social media database in communication with the communications server that includes (a) identities of suspended social media accounts, (b) for each of the suspended social media accounts, the reason as to why it was suspended, (c) a name of an owner of the social media account, (d) content of threatening social media posts by the owner, and (e) content of posts by the owner that reference the first user.

* * * * *